United States Patent
Niemelä et al.

(10) Patent No.: US 8,844,039 B2
(45) Date of Patent: Sep. 23, 2014

(54) MALWARE IMAGE RECOGNITION

(75) Inventors: Jarno Niemelä, Espoo (FI); Kimmo Kasslin, Espoo (FI)

(73) Assignee: F-Secure Corporation, Helsinki (FI)

( * ) Notice: Subject to any disclaimer, the term of this patent is extended or adjusted under 35 U.S.C. 154(b) by 677 days.

(21) Appl. No.: 12/803,613

(22) Filed: Jun. 30, 2010

(65) Prior Publication Data

US 2012/0002839 A1    Jan. 5, 2012

(51) Int. Cl.
*H04L 29/06* (2006.01)
*G06K 9/00* (2006.01)

(52) U.S. Cl.
CPC .......... *G06K 9/00973* (2013.01); *H04L 63/145* (2013.01)
USPC .............................................. 726/24; 713/188

(58) Field of Classification Search
USPC .......................................................... 726/24
See application file for complete search history.

(56) References Cited

U.S. PATENT DOCUMENTS

| 2003/0229810 A1* | 12/2003 | Bango ........................... 713/201 |
| 2004/0123117 A1* | 6/2004 | Berger ........................... 713/188 |
| 2004/0210769 A1* | 10/2004 | Radatti et al. ................. 713/201 |
| 2008/0127340 A1* | 5/2008 | Lee .................................. 726/22 |
| 2009/0199296 A1* | 8/2009 | Xie et al. ......................... 726/23 |

* cited by examiner

*Primary Examiner* — Yogesh Paliwal
(74) *Attorney, Agent, or Firm* — Harrington & Smith

(57) ABSTRACT

According to a first aspect of the present invention there is provided a method of detecting malware or other potentially unwanted programs. The method includes, at each of a plurality of client terminals, when it is determined that a program may be malware or a potentially unwanted program, generating image recognition data from displayed image data that includes image elements generated by the program, and sending the image recognition data to a central server. At the central server, storing the received image recognition data, and using the stored image recognition data to detect the presence of a malware or potentially unwanted program at the client terminals.

18 Claims, 3 Drawing Sheets

_(12) United States Patent_

MALWARE IMAGE RECOGNITION

TECHNICAL FIELD

The present invention relates to the detection of malware, or other potentially unwanted programs, using image recognition. In particular, the present invention relates to a method of using image recognition data as malware detection information.

BACKGROUND

Malware is short for malicious software and is used as a term to refer to any software designed to infiltrate or damage a computer system without the owner's informed consent. Malware can include computer viruses, worms, trojan horses, rootkits, and spyware. In order to prevent problems associated with malware infections, many end users make use of anti-virus software to detect and possibly remove malware. In addition, anti-virus software is often also used to detect any other potentially unwanted programs (PUP). A PUP is a program that may be unwanted, despite the possibility that users consented to download it, often downloading the program in conjunction with a program that the user wants. PUPs can include spyware, adware, scareware, and scamware.

In order to detect a malware or PUP file, the anti-virus software must have some way of identifying it amongst all the other files present on a device. Typically, this requires that the anti-virus software has a database containing the "signatures" or "fingerprints" that are characteristic of individual malware or PUP files. When the supplier of the anti-virus software identifies new malware or a new PUP, the program is analysed and its signature is generated. The malware or PUP is then "known" and its signature can be distributed to end users as updates to their local anti-virus software databases.

Using approaches that solely rely on signature scanning to detect malware still leaves computers vulnerable to "unknown" or "zero day" malware programs/applications that have not yet been analysed for their signature. To address this issue, in addition to scanning for malware or PUP signatures, most anti-virus applications additionally employ heuristic analysis. This approach involves the application of general rules intended to distinguish the behaviour of any malware or PUP from that of clean/legitimate programs. For example, the behaviour of all programs/applications on a PC may be monitored and if a program/application attempts to write data to an executable file, the anti-virus software can flag this as suspicious behaviour. Heuristics can be based on behaviours such as API calls, attempts to send data over the Internet, etc. However, due to the ever increasing and ever changing nature of malware, these heuristic detection methods are not sufficient to detect all unknown malware.

SUMMARY

It is an object of the present invention to obtain image recognition data associated with malware or other potentially unwanted programs, and to use this image recognition data to detect the presence of malware or other potentially unwanted program. This is achieved by generating the image recognition data associated with any possible malware or other potentially unwanted programs at client terminals, and sending this image recognition data to a centralised server. Then, when it is determined whether or not a particular program is malware or a potentially unwanted program, this image recognition data can be used to detect the presence of the program at the client terminals.

According to a first aspect of the present invention there is provided a method of detecting malware or other potentially unwanted programs. The method comprises, at each of a plurality of client terminals, when it is determined that a program may be malware or a potentially unwanted program, generating image recognition data from displayed image data that includes image elements generated by the program, and sending the image recognition data to a central server. At the central server, storing the received image recognition data, and using the stored image recognition data to detect the presence of a malware or potentially unwanted program at the client terminals.

The step of using the stored image recognition data to detect the presence of malware or a potentially unwanted program at the client terminals may comprise, at the central server, upon a determination that a program is malware or a potentially unwanted program, notifying each of the client terminals from which image recognition data associated with the malware program has been received. If so, this step may further comprise, at the central server, if any image recognition data received from a client terminal is determined as potentially matching stored image recognition associated with the program, sending the image recognition data associated with the program to the client terminal. Alternatively, the step of using the stored image recognition data to detect the presence of malware or a potentially unwanted program at the client terminals may comprise, at the central server, upon a determination that a program is malware or a potentially unwanted program, distributing the image recognition data associated with that program to the plurality of client terminals for use in detecting the program.

The step of generating image recognition from displayed image data may comprise applying a one-way function to displayed image data that includes image elements generated by the program, such that the displayed image cannot easily be recovered from the image recognition data. The one-way function applied to the displayed image data may comprise any of:

a Scale-invariant Feature Transform, SIFT, algorithm; and an Optical Character Recognition, OCR, algorithm.

The method may further comprise, at each of the client terminals, when it is determined that a program may be malware or a potentially unwanted program, generating an identifier for the program, and sending the program identifier to the central server for storage with the image recognition data. If so, then upon a determination that a program is malware or a potentially unwanted program, the central server may generate an identifier for the program, and compare the generated identifier with the stored program identifiers to identify any associated image recognition data. The step of generating an identifier for a program may comprise generating a hash value of the program file.

The method may further comprise, at each of the client terminals, in addition to generating image recognition data, generating indexing information from the displayed image data, the indexing information being sent to the central server for storage with the image recognition data. The initial indexing information may comprise key features extracted from the displayed image data. The indexing information may be extracted from the from the image recognition data.

The method may then further comprise, at the central server, upon receipt of image recognition data including indexing information, comparing the received index information with previously stored index information to identify potentially matching image recognition data previously stored at the central server. If the central server does not identify potentially matching image recognition data, the central server may store the received image recognition data individually. Alternatively, if the central server identifies potentially matching image recognition data, the potentially matching image recognition data may be sent to the client terminal, and the client terminal compare the potentially matching image recognition data to the displayed image data to determine if it is a match.

If the potentially matching image recognition data is a match, then the client terminal may notify the central server, and the central server may store the received image recognition data in association with the previously stored matching image recognition data. Alternatively, if the potentially matching image recognition data is not a match, then the client terminal may notify the central server, and the central server store the received image recognition data individually.

According to a second aspect of the present invention there is provided a method of operating a server. The method comprises receiving image recognition data from each of a plurality of client terminals, the image recognition data having been generated from displayed image data that includes image elements generated by a program that the client terminal has determined as possibly being malware or a potentially unwanted program, storing the received image recognition data, and using the stored image recognition data to detect the presence of a malware or potentially unwanted program at the client terminals.

The step of using the stored image recognition data to detect the presence of malware or a potentially unwanted program at the client terminals may comprise, upon a determination that a program is malware or a potentially unwanted program, notifying each of the client terminals from which image recognition data associated with that program has been received. Alternatively, the step of using the stored image recognition data to detect the presence of malware or a potentially unwanted program at the client terminals may comprise, upon a determination that a program is malware or a potentially unwanted program, retrieving stored image recognition data associated with the program, and distributing the associated image recognition data to the plurality of client computers for use in detecting the program.

According to a third aspect of the present invention there is provided a computer program comprising computer program code means adapted to perform the following steps:
  accept image recognition data received from each of a plurality of client terminals, the image recognition data having been generated from displayed image data that includes image elements generated by a program that the client terminal has determined as possibly being malware or a potentially unwanted program;
  implement storage of the received image recognition data; and
  use the stored image recognition data to detect the presence of a malware or potentially unwanted program at the client terminals.

The step of using the stored image recognition data to detect the presence of malware or a potentially unwanted program at the client terminals may comprise, upon a determination that a program is malware or a potentially unwanted program, notifying each of the client terminals from which image recognition data associated with that program has been received. Alternatively, the step of using the stored image recognition data to detect the presence of malware or a potentially unwanted program at the client terminals may comprise, upon a determination that a program is malware or a potentially unwanted program, retrieving stored image recognition data associated with the program, and distributing the associated image recognition data to the plurality of client computers for use in detecting the program.

According to a fourth aspect of the present invention there is provided a computer program according to the third embodiment embodied on a computer readable medium.

According to a fifth aspect of the present invention there is provided a server for use in detecting malware or potentially unwanted programs at a plurality of client terminals. The server comprises a receiver receiving image recognition data from the plurality of client terminals, the image recognition data having been generated from displayed image data that includes image elements generated by a program that the client terminal has determined as possibly being malware or a potentially unwanted program, a memory for storing the received image recognition data, and a processor for using the stored image recognition data to detect the presence of a malware or potentially unwanted program at the client terminals. The processor may be further configured to determine if a program is malware or a potentially unwanted program. The server may further comprise a transmitter for, if it is determined that a program is malware or a potentially unwanted program, notifying each of the client terminals from which image recognition data associated with the program has been received. Alternatively, the server may further comprise a transmitter for, if it is determined that a program is malware or a potentially unwanted program, distributing stored image recognition data associated with the program to the plurality of client computers for use in detecting the program.

According to a sixth aspect of the present invention there is provided a method of operating a client terminal. The method comprises, when it is determined that a program may be malware or a potentially unwanted program, generating image recognition data from displayed image data that includes image elements generated by the program, and sending the image recognition data to a central server. The method may further comprise receiving a notification from the central server that the program is malware or a potentially unwanted program. Alternatively, the method may further comprise receiving detection image recognition data from the central server, and using the detection image recognition data to detect the presence of a malware or potentially unwanted program.

The step of generating image recognition from displayed image data may comprise applying a one-way function to displayed image data that includes image elements generated by the program, such that the displayed image cannot easily be recovered from the image recognition data.

According to a seventh aspect of the present invention there is provided a computer program comprising computer program code means adapted to perform the following steps:
  determine that a program may be malware or a potentially unwanted program;
  generate image recognition data from displayed image data that includes image elements generated by the program; and
  send the image recognition data to a central server.

The steps may further comprise receiving a notification from the central server that the program is malware or a potentially unwanted program. Alternatively, the steps may further comprise receiving detection image recognition data from the central server, and using the detection image recognition data to detect the presence of a malware or potentially unwanted program. The step of generating image recognition from displayed image data may comprise applying a one-way function to displayed image data that includes image elements generated by the program, such that the displayed image cannot easily be recovered from the image recognition data.

According to an eighth aspect of the present invention there is provided a computer program according to the seventh embodiment embodied on a computer readable medium.

According to a ninth aspect of the present invention there is provided a client terminal. The client terminal may comprise a processor for determining if a program may be malware or a potentially unwanted program and, if so, for generating image recognition data from displayed image data that includes image elements generated by the program, and a transmitter for sending the image recognition data to a central server. The client terminal may further comprise a receiver for receiving a notification from the central server that the program is malware. Alternatively, the client terminal may further comprise a receiver for receiving detection image recognition data from the central server, and the processor may be further configured to use the detection image recognition data to detect the presence of a malware or potentially unwanted program. The processor may be further configured to generate image recognition data by applying a one-way function to displayed image data that includes image elements generated by the program, such that the displayed image cannot easily be recovered from the image recognition data.

According to a tenth aspect of the present invention there is provided a method of operating a client terminal. The method comprises receiving image recognition data associated with a malware or potentially unwanted program, using the received image recognition data to determine if a program executed on the client terminal generates image elements that match the image recognition data, and, if so, identifying the program as malware or a potentially unwanted program.

According to an eleventh aspect of the present invention there is provided a computer program comprising computer program code means adapted to perform the following steps:
  accept image recognition data associated with a malware or potentially unwanted program;
  use the received image recognition data to determine if a program executed on the client terminal generates image elements that match the image recognition data; and
  if so, identify the program as malware or a potentially unwanted program.

According to a twelfth aspect of the present invention there is provided a computer program according to the eleventh embodiment embodied on a computer readable medium.

According to a thirteenth aspect of the present invention there is provided a client terminal comprising a receiver for receiving image recognition data associated with a malware or potentially unwanted program, and a processor for determining if a program executed on the client terminal generates image elements that match the image recognition data and, if so, for identifying the program as malware or a potentially unwanted program.

DETAILED DESCRIPTION

Whilst many forms of malware and other unwanted software are designed to hide any indication of their presence, some malware and PUP programs, such as adware, scamware or scareware programs, are designed to display elements on the graphical user interface (GUI) of a computer system. For example, adware programs usually silently install themselves on a computer device in order to display advertising material to the user. By way of further example, scareware or scamware, such as rogue anti-virus or anti-spyware applications, usually silently install themselves on a computer system before displaying some information to the user. In many cases, scareware programs display hoax messages and warnings that a computer device is infected with some form of malware, and offers to disinfect the device provided that the user purchases a license to the software.

It is therefore possible to detect the presence of some malware and PUP programs by using image recognition to determine when a display element associated with a particular malware or PUP program is displayed on the GUI of a computer system. In order for an anti-virus application to perform this detection using image recognition, a screenshot or screen capture of the display data generated by a malware or PUP program must be obtained and distributed by the supplier of the anti-virus application as a "fingerprint". However, it has been recognised here that this can be difficult to achieve as many malware and PUP programs are designed to prevent themselves from executing in a virtual or emulated environment.

In order to at least partially overcome the problem described above, there will now be described methods and apparatus for obtaining image recognition data, and for using this image recognition data to detect the presence of a malware or other potentially unwanted program, wherein the image recognition data is generated at client terminals from displayed image data and provided to an anti-virus supplier's centralised servers. For the sake of clarity, malware will be used to refer to both malware programs and PUPs.

In addition, it has also been recognised here that privacy issues can prevent, or at the very least can make it undesirable for an anti-virus application to capture screenshots directly from user computer systems for uploading to the anti-virus supplier's centralised servers. To overcome this additional problem, it is also proposed here to make use of a one-way/non-reversible function at the client terminals in order to generate the image recognition data from displayed image data, such that the displayed image cannot easily be recovered from the image recognition data.

Figure 1:
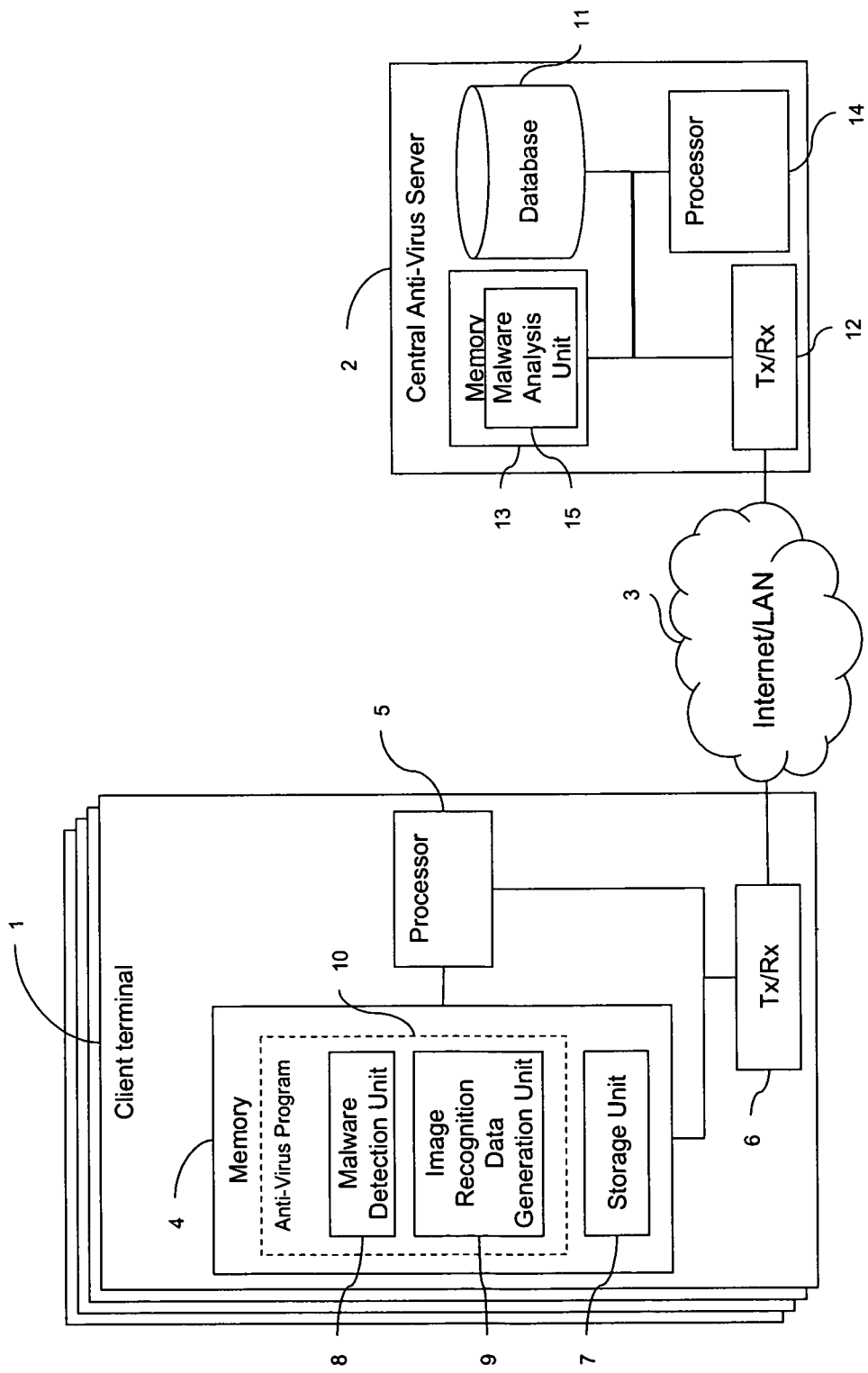
FIG. 1 illustrates schematically a computer system according to an embodiment of the present invention.

FIG. 1 illustrates schematically a system according to an embodiment of the present invention and which comprises a plurality of client terminals 1 connected to a central anti-virus server 2 via a network 3 such as the Internet or a LAN. Each of the client terminals 1 can be implemented as a combination of computer hardware and software. A client terminal 1 comprises a memory 4, a processor 5 and a transceiver 6. The memory 4 stores the various programs/executable files that are implemented by the processor 5, and also provides a storage unit 7 for any required data. The programs/executable files stored in the memory 4, and implemented by the processor 5, include a malware detection unit 8 and an image recognition data generation unit 9. The malware detection unit 8 and image recognition data generation unit 9 can be sub-units of an anti-virus application 10. The transceiver 6 is used to communicate with the central anti-virus server 2 over the network 3. Typically, the client terminals 1 may be any of a desktop personal computer (PC), laptop, personal data assistant (PDA) or mobile phone, or any other suitable device.

The central anti-virus server 2 is typically operated by the provider of the anti-virus application 10 that is run on each of the client terminals 1, and the users of these terminals will usually be subscribers to an update service supplied by the central anti-virus server 2. Alternatively, the central anti-virus server 2 may be that of a network administrator or supervisor, each of the client terminals 1 being part of the network for which the supervisor is responsible. The central anti-virus server 2 comprises a database 11 for storing entries that include image recognition data and associated program identification data, as well as any other malware-related data, and a transceiver 12 for communicating with the client terminals 1 over the network 3. The central anti-virus server 2 can further comprise a memory 13 and a processor 14. The memory 13 can store programs/executable files that can be implemented by the processor 14. The programs/executable files stored in the memory 13, and implemented by the processor 14, can include a malware analysis unit 15.

Figure 2:
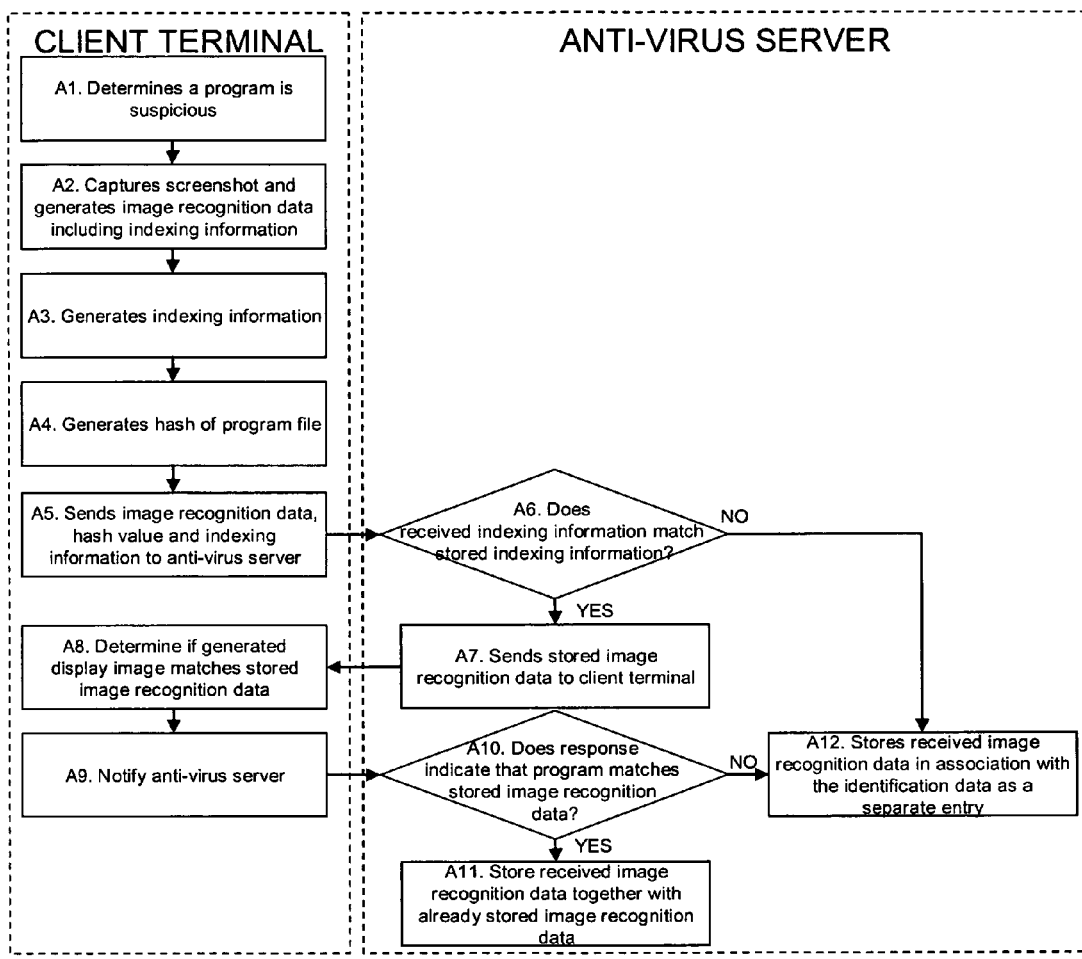
FIG. 2 is a flow diagram illustrating a process of obtaining image recognition data for use in detecting malware or other potentially unwanted programs.

FIG. 2 is a flow diagram illustrating the process of obtaining image recognition data for use in detecting malware or other potentially unwanted programs. The steps are performed as follows:

A1. The anti-virus application 10 on a user's client terminal 1 determines that a program present on the client terminal 1 is suspicious and may therefore be malware. By way of example, the anti-virus application 10 may identify a program as suspicious if:
it determines that the program is new;
if it does not recognise the program as one that it has previously identified as clean/legitimate;
if it generates suspicious image elements (e.g. infection warnings, or image elements already known to be associated with malware etc) on the display of the client terminal; and
if the structure of the program file is suspicious.

A2. The anti-virus application 10 will then take one or more screenshots or screen captures whilst the program is executing, in order to capture display data that includes any image elements generated on the display of the client terminal 1 by the program. These image elements can include dialog boxes, pop-up windows, message balloons, etc. The anti-virus application 10 then generates image recognition data from the captured display data. This image recognition data is generated using a one-way function such that it is impossible or impractical to reconstruct the original screenshot from the data, but such that it can still be used to identify any matching images. For example, the image recognition data could be generated by applying a Scale-invariant Feature Transform (or SIFT) algorithm to the display data.

A3. The anti-virus application 10 also generates some initial indexing/identification information for the program. This initial indexing information takes the form of some key features, or key points, of the display data that includes the image elements generated by the program. For example, this may be the strings present in the display data. This indexing information could be comprised of particular components extracted from the image recognition data or could be generated using some separate algorithm, depending upon the algorithm used to generate the image recognition data.

A4. The anti-virus application 10 also generates an identifier for the program by applying a hash function to the program file.

A5. The image recognition data is then sent to the centralised anti-virus server 2, together with an identifier of the client terminal, the hash value of the program file and the indexing information.

A6. The centralised anti-virus server 2 then determines if the received indexing information matches any indexing information already stored in its database. If the received indexing information does not match any of the stored indexing information, then the process proceeds to step A11.

A7. If the received indexing information does match any of the stored indexing information, then anti-virus server 2 retrieves the stored image recognition data associated with the matching indexing information and sends this to the client terminal.

A8. The client terminal 1 then determines if the display data includes any image elements generated by the program that match the image recognition data received from the central anti-virus server 2.

A9. The client terminal 1 notifies the anti-virus server 2 of the result.

A10. The anti-virus server 2 determines the result from the response received from the client terminal 1. If the client terminal 1 notifies the anti-virus server 2 that the display image generated by the program does not match the stored image recognition data, then the process proceeds to step A11.

A11. If the client terminal 1 notifies the anti-virus server 2 that the display image generated by the program does match the previously stored image recognition data, then the anti-virus server 2 stores the image recognition data, the hash value of the program file and the identifier of the client terminal, received from the client terminal 1 in step A5, in association with the already stored indexing information and image recognition data. Therefore, if a client terminal 1 subsequently sends matching indexing information, the anti-virus server 2 will respond with both the previously stored image recognition data that was sent in step A6, and the newly stored image recognition data that has been stored in the same entry.

A12. If the received indexing information does not match any identification data already stored by the anti-virus server 2, or if the client terminal 1 notifies the anti-virus server 2 that the display image generated by the program does not match the stored image recognition data, then the anti-virus server 2 stores the image recognition data, the hash value of the program file and the identifier of the client terminal, received from the client terminal 1 in step A5, together with the received indexing information as a new individual entry in the database. Therefore, if a client terminal subsequently sends matching indexing information, the anti-virus server 2 will respond with both the previously stored image recognition data that was sent in step A6, and the newly stored image recognition data from the separate database entries.

As described above, if the client terminal 1 indicates that the display data from which the received image recognition data has been generated matches any of the image recognition data received from the anti-virus server 2, then the anti-virus server 2 stores the received image recognition data and program identifier in association with the matching previously stored image recognition data. In doing so, the anti-virus server 2 performs a process of server-side grouping, in which programs that generate the same image elements are grouped into a single set for classification purposes. As such, if any one of the programs within the same set/group is classified as malware, then the anti-virus server 2 can be configured to identify all programs within the set as also being malware.

In addition to sending the image recognition data and program identifiers to the anti-virus sever 2, the client terminals 1 could also collect and send details of any actions performed during the installation of the program, in order to obtain the registry paths, files, mutexes, registry keys etc that may have been created by the program. This information could then be used when disinfecting the client terminals if it is determined that the program is malware. Alternatively, if it is determined that the program is malware, the anti-virus application present on the client terminals could perform a scan to search for any paths, registry keys etc that contain strings extracted from the display data that included image elements generated by the program.

Furthermore, the combination of image recognition data and associated hash values could be useful as a form of heuristic analysis. If the anti-virus server 2 were to identify a single item of image recognition data as being associated with a large number of different hash values, then this would be an indication that the same image elements have been generated by different program files. Therefore, given that it would be unusual for multiple legitimate programs to generate the same display data, this would be an indication that the associated program files are likely to be malware. This method is particularly useful when attempting to detect malware programs that obfuscate their binary code, as even though the binary code may vary between each occurrence of the malware, each occurrence of the malware program will likely generate image elements that are substantively the same.

There are various one-way functions that could be used to perform the image recognition and comparison steps. For example, a SIFT algorithm could be used to generate a "feature description" from the display data, the description defining the display image using any interesting points. This description could then be used to determine if any other display data contains images with the same interesting points. Alternatively, Optical Character Recognition (OCR) could be used to extract text/strings from display data that includes image elements generated by a program of interest.

This method provides that the supplier of an anti-virus application can obtain malware image recognition data without the need to overcome the difficulty of executing the malware program in a virtual environment and without breaching the user privacy.

Figure 3:
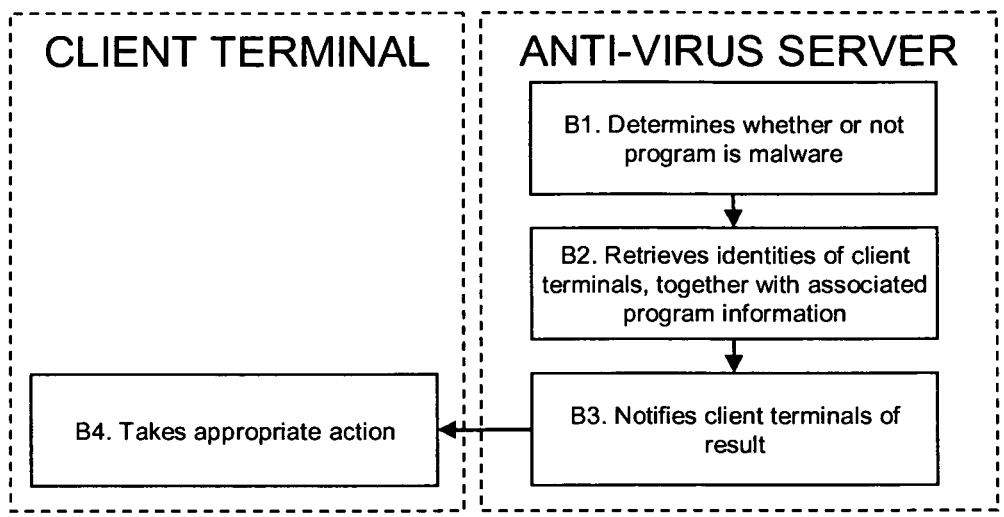
FIG. 3 is a flow diagram illustrating a process of implemented when a program is subsequently determined as being either malware or legitimate.

The anti-virus server 2 continues to store image recognition data received from clients, as outlined above, until it can make a determination as to whether or not a program relates to malware. FIG. 3 is a flow diagram illustrating a possible process implemented when a program is subsequently determined as being either malware or legitimate. The steps are performed as follows:

B1. The anti-virus server 2 determines whether or not a particular program relates to malware (e.g. having performed a full analysis of the program file).

B2. The anti-virus server 2 retrieves the identities of all of the client terminals 1 that have previously provided matching indexing information or both matching indexing information and image recognition data from the database. The anti-virus server also retrieves the program information (e.g. program file hash etc) provided by each of the client terminals.

B3. The anti-virus server 2 then notifies each of the client terminals whose details have been retrieved from the database of the result of the determination. For example, if the program has been identified as malware it notifies the client terminals of this.

B4. The notified client terminals 1 can then take any appropriate action. For example, if a program is identified as malware, then the anti-virus application at the client terminal can prompt the user to disinfect or quarantine the malware program.

Figure 4:
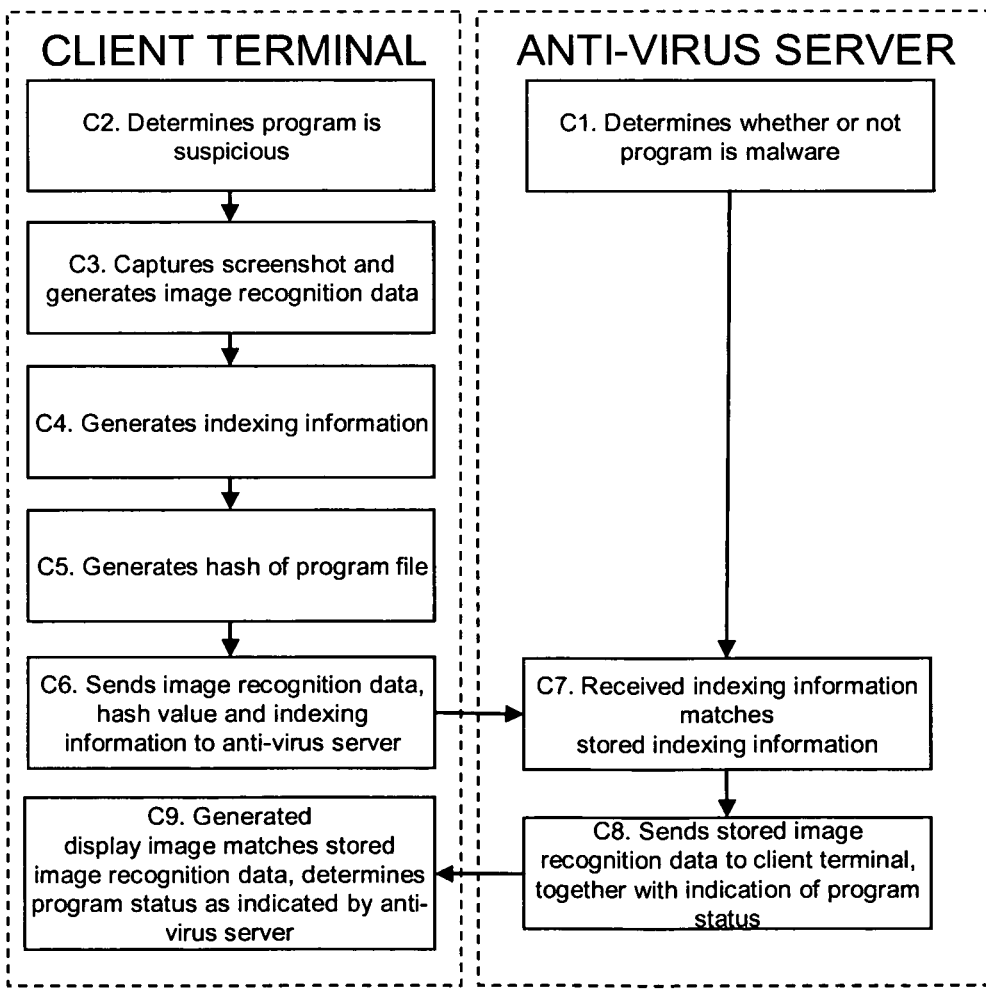
FIG. 4 is a flow diagram illustrating an alternative process of implemented when a program is subsequently determined as being either malware or legitimate

In addition, or as an alternative to the process outlined above, FIG. 4 is a flow diagram illustrating a possible process implemented when a client terminal 1 sends image recognition data and indexing information to the anti-virus server 2, after the anti-virus server 2 has determined whether or not the program is malware. The steps are performed as follows:

C1. The anti-virus server 2 determines whether or not a particular program relates to malware.

C2. Subsequently, the anti-virus application 10 on a user's client terminal 1 determines that a program present on the client terminal 1 is suspicious and may therefore be malware.

C3. The anti-virus application 10 will then take one or more screenshots or screen captures whilst the program is executing, in order to capture display data that includes any image elements generated on the display of the client terminal 1 by the program. The anti-virus application 10 then generates image recognition data from the captured display data.

C4. The anti-virus application 10 also generates some initial indexing/identification information for the program.

C5. The anti-virus application 10 also generates an identifier for the program by applying a hash function to the program file.

C6. The image recognition data is then sent to the centralised anti-virus server 2, together with an identifier of the client terminal, the hash value of the program file and the indexing information.

C7. The anti-virus server 2 determines that the received indexing information matches the indexing information stored for the program and retrieves the associated stored image recognition data.

C8. The stored image recognition data is then sent to the client terminal 1, together with an indication as to whether or not the program that matches the image recognition data is malware or legitimate, as previously determined by the anti-virus server 2 in step C1.

C9. The client terminal 1 then determines that at least some of the image recognition data received from the anti-virus server 2 matches the image elements generated by the program, and therefore that the program is malware or legitimate, as indicated by the anti-virus server 2.

It will be appreciated by the person of skill in the art that various modifications may be made to the above described embodiments without departing from the scope of the present invention. For example, whilst the above-described embodiments make use of a one-way function to generate the image recognition data, this is not essential but is merely preferable in order to provide privacy for the user's of the client terminals. In addition, the above-described embodiments also make use of indexing information in order to identify possible matching image recognition data. Whilst the use of indexing information does improve the performance of the invention, it is not essential, as the central anti-virus server could equally provide all of the relevant image recognition data to the client terminals. Furthermore, whilst in the above-described embodiments the key features that comprise the indexing information are determined at the client terminal, these key features could equally be determined by the anti-virus server from the received image recognition data.

The invention claimed is:

1. A method of detecting malware or potentially unwanted programs, the method comprising:
    at each of a plurality of client terminals, when it is determined that a program may be malware or a potentially unwanted program, generating image recognition data from displayed image data that includes image elements generated by the program, and sending the image recognition data to a central server;
    at the central server, storing the received image recognition data, and using the stored image recognition data to detect a presence of a malware or potentially unwanted program at the plurality of client terminals; and
    at each of the plurality client terminals, in addition to generating image recognition data, generating indexing information from the displayed image data, the indexing information being sent to the central server for storage with the image recognition data.

2. A method as claimed in claim 1, wherein the step of using the stored image recognition data to detect the presence of a malware or potentially unwanted program at the client terminals comprises:
    at the central server, upon a determination that a program is malware or a potentially unwanted program, notifying each of the client terminals from which image recognition data associated with the program has been received.

3. A method as claimed in claim 1, wherein the step of using the stored image recognition data to detect the presence of a malware or potentially unwanted program at the client terminals comprises:
    at the central server, upon a determination that a program is malware or a potentially unwanted program, distributing the image recognition data associated with that program to the plurality of client terminals for use in detecting the program.

4. A method as claimed in claim 1, wherein the step of generating image recognition from displayed image data comprises:
    applying a one-way function to displayed image data that includes image elements generated by the program, such that the displayed image cannot easily be recovered from the image recognition data.

5. A method as claimed in claim 1, and further comprising:
    at each of the client terminals, when it is determined that a program may be malware or a potentially unwanted program, generating an identifier for the program, and sending the program identifier to the central server for storage with the image recognition data.

6. A method as claimed in claim 5, wherein, upon a determination that a program is malware or a potentially unwanted program, the central server generates an identifier for the program, and compares the identifier with the stored program identifiers to identify any associated image recognition data.

7. A method as claimed in claim 1, and further comprising:
    at the central server, upon receipt of image recognition data including indexing information, comparing the received index information with previously stored index information to identify potentially matching image recognition data previously stored at the central server.

8. A method as claimed in claim 7, wherein, if the central server does not identify potentially matching image recognition data, the central server stores the received image recognition data individually.

9. A method as claimed in claim 7, wherein, if the central server identifies potentially matching image recognition data, the potentially matching image recognition data is sent to the client terminal, and the client terminal compares the potentially matching image recognition data to the displayed image data to determine if it is a match.

10. A method as claimed in claim 9, wherein, if the potentially matching image recognition data is a match, the client terminal notifies the central server, and the central server stores the received image recognition data in association with the previously stored matching image recognition data.

11. A method as claimed in claim 9, wherein, if the potentially matching image recognition data is not a match, the client terminal notifies the central server, and the central server stores the received image recognition data individually.

12. A non-transitory computer storage medium having stored thereon a computer program comprising computer program code means adapted to perform the following steps:
    accept image recognition data and indexing data received from each of a plurality of client terminals, the image recognition data and the indexing data having been generated from displayed image data that includes image elements generated by a program that a client terminal has determined as possibly being malware or a potentially unwanted program;
    implement storage of the received image recognition data and the indexing data; and
    use the stored image recognition data to detect a presence of a malware or potentially unwanted program at the plurality of client terminals.

13. A non-transitory computer storage medium having stored thereon a computer program as claimed in claim 12, wherein the step of using the stored image recognition data to detect the presence of a malware or potentially unwanted program at the client terminals comprises:
    upon a determination that a program is malware or a potentially unwanted program, notifying each of the client terminals from which image recognition data associated with that program has been received.

14. A non-transitory computer storage medium having stored thereon a computer program as claimed in claim 12, wherein the step of using the stored image recognition data to detect the presence of a malware or potentially unwanted program at the client terminals comprises:
    upon a determination that a program is malware or a potentially unwanted program, retrieving stored image recognition data associated with the program, and distributing the associated image recognition data to the plurality of client computers for use in detecting the program.

15. A non-transitory computer storage medium having stored thereon a computer program comprising computer program code means adapted to perform the following steps:
    determine that a program may be malware or a potentially unwanted program;
    generate image recognition data from displayed image data that includes image elements generated by the program;
    generate indexing information from the displayed image data; and
    send the image recognition data and the indexing information to a central server.

16. A non-transitory computer storage medium having stored thereon a computer program as claimed in claim 15, wherein the steps further comprise:
    receiving a notification from the central server that the program is malware or a potentially unwanted program.

17. A non-transitory computer storage medium having stored thereon a computer program as claimed in claim 15, wherein the steps further comprise:

receiving detection image recognition data from the central server; and using the detection image recognition data to detect the presence of a malware or potentially unwanted program.

18. A non-transitory computer storage medium having stored thereon a computer program as claimed in claim 15, wherein the step of generating image recognition from displayed image data comprises:

applying a one-way function to displayed image data that includes image elements generated by the program, such that the displayed image cannot easily be recovered from the image recognition data.

* * * * *